(12) United States Patent
Tominaga

(10) Patent No.: US 6,707,622 B2
(45) Date of Patent: Mar. 16, 2004

(54) RESIN-MOLDED PRISM AND MOLD FOR THE SAME

(75) Inventor: Takahiro Tominaga, Tokushima (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 09/911,382

(22) Filed: Jul. 25, 2001

(65) Prior Publication Data

US 2002/0030900 A1 Mar. 14, 2002

(30) Foreign Application Priority Data

Aug. 3, 2000 (JP) ........................................ 2000-235912

(51) Int. Cl.⁷ ................................................ G02B 5/04
(52) U.S. Cl. ........................................ 359/831; 264/1.1
(58) Field of Search .............................. 359/831, 833, 359/834, 835, 836, 837; 264/2.5, 1.1

(56) References Cited

U.S. PATENT DOCUMENTS

| | | | | |
|---|---|---|---|---|
| 3,860,329 A | * | 1/1975 | Baker et al. ............... | 359/833 |
| 4,252,294 A | * | 2/1981 | Uchio ......................... | 249/105 |
| 5,680,260 A | * | 10/1997 | Farcella et al. ............ | 359/819 |
| 5,912,769 A | * | 6/1999 | Iizuka et al. ............... | 359/631 |
| 6,084,715 A | * | 7/2000 | Aoki et al. ................. | 359/627 |
| 6,219,188 B1 | * | 4/2001 | Tsukamoto ................. | 359/629 |
| 6,330,121 B1 | * | 12/2001 | Kobayashi et al. ........ | 359/831 |
| 6,404,556 B1 | * | 6/2002 | Kobayashi .................. | 359/630 |
| 6,441,978 B1 | * | 8/2002 | Kobayashi et al. ........ | 359/834 |

FOREIGN PATENT DOCUMENTS

| | | | |
|---|---|---|---|
| JP | 57-040201 A | * | 3/1982 |
| JP | 2778651 | | 7/1998 |
| JP | 10-305458 | | 11/1998 |
| JP | 11-99525 A | * | 4/1999 |

* cited by examiner

*Primary Examiner*—John Juba, Jr.
(74) *Attorney, Agent, or Firm*—Fitzpatrick, Cella, Harper & Scinto

(57) ABSTRACT

A resin prism including two or more optical surfaces (11–13) that are not parallel to each other, a pair of side end faces (14, 15) substantially perpendicular to the optical surfaces (11–13), at least one reference block (17) projecting from either one of the pair of side end faces (14, 15) and having a circumferential end face (16) extending in a projecting direction of the reference block, a positioning portion (19, 20) formed on the circumferential end face (16) of the reference block (17), and a curved surface (18) for smoothly connecting the circumferential end face (16) of the reference block (17) and corresponding one of the pair of side end faces (14, 15), wherein the circumferential end face (16) and the corresponding one of the side end faces (14, 15) form an angle of 90° or more.

3 Claims, 8 Drawing Sheets

RESIN-MOLDED PRISM AND MOLD FOR THE SAME

FIELD OF THE INVENTION

The present invention relates to a resin-molded prism with a good optical performance and manufactured by injection molding capable of high-precision positioning, and a mold for injection-molding this resin-molded prism.

BACKGROUND OF THE INVENTION

A method of manufacturing an optical component in accordance with injection molding by using a resin has been developed aiming at reduction in cost and weight of the optical component. When an optical component is to be manufactured by injection molding, elements for attaching and positioning with respect to an optical device can be molded integrally with the optical component, so the optical component can be assembled and positioned easily, and the number of components can be reduced. For example, Japanese Patent No. 2778651 discloses an arrangement in which a positioning portion for positioning an optical prism to be manufactured by injection molding is formed integrally with the optical prism.

In injection molding of an optical component, it should be noted that when a resin in the molten state passes through the gate and fills a cavity formed in a mold, no flow marks should be formed by inclusion of the resin. Based on this viewpoint, according to the technique disclosed in Japanese Patent Laid-Open No. 10-305458, when injection-molding a block-like optical component such as a prism, a gate is connected to the ridgeline of two adjacent surfaces of a molded product, and the direction of the gate is inclined equally with respect to the two surfaces, so flow marks which are formed when a molten resin is to fill a cavity are suppressed.

FIGS. 6 to 8 schematically show injection molding procedures disclosed in Japanese Patent Laid-Open No. 10-305458. More specifically, when a gate 4 is connected to the ridgeline of two adjacent molding surfaces 2 and 3 of a cavity 1 and the extending direction of the gate 4 is inclined equally with respect to the two molding surfaces 2 and 3, as the sectional area of the resin flow path from the gate 4 to the cavity 1 rapidly increases, resin separation A (see FIG. 7) from the molding surfaces 2 and 3 and flow disorder occur during filling of a molten resin 5 into the cavity 1. Then, when filling is ended, flow marks 6 (see FIG. 8) and a weld sometimes occur in the optical component. Regarding these drawbacks, if the filling rate of the resin with respect to the cavity 1 is decreased, a region which is located in the vicinity of the gate 4 to adversely affect the optical performance of the optical component can be decreased, but it is difficult to completely eliminate this region. When the filling rate decreases, the transfer performance decreases, and a high-precision optical surface cannot be molded. Also, it can be easily anticipated that a shear strain during filling of the resin is large in the vicinity of the gate 4, so the resin solidifies directly likely to cause residual stress.

In a thick molded product such as a prism, when the cavity 1 is filled with the molten resin 5, a dwell process of replenishing the molten resin 5 from the gate 4 with an appropriate pressure is generally performed even after filling is completed, so a sink mark is prevented from being formed by resin shrinkage that accompanies cooling. Since resin replenishment in the dwell process is performed while cooling of the gate 4 and its vicinity progresses and the resin viscosity increases, a residual stress tends to occur due to the shear strain even during the dwell process. The residual stress caused in this manner not only causes birefringence to degrade the optical characteristics of the optical component but also causes a change in the shape of the optical surface by stress relaxation when the optical component is in use for a long period of time.

SUMMARY OF THE INVENTION

It is an object of the present invention to provide a resin-molded prism with two or more optical surfaces, in which an adverse influence of a flow mark or residual stress occurring in the vicinity of a gate is eliminated so as to provide good optical characteristics, and moldability of which can be improved by moderating injection molding conditions, and a mold for injection-molding this resin-molded prism.

The first aspect of the present invention resides in a resin-molded prism characterized by comprising not less than two optical surfaces that are not parallel to each other, a pair of side end faces substantially perpendicular to the optical surfaces, at least one reference block projecting from either one of the pair of side end faces and having a circumferential end face extending in a projecting direction of the reference block, a positioning portion formed on the circumferential end face of the reference block, and a curved surface for smoothly connecting the circumferential end face of the reference block and corresponding one of the pair of side end faces, wherein the circumferential end face and the corresponding one of the side end faces form an angle of not less than 90°.

According to the present invention, a molten resin fills a cavity formed in a mold that molds a prism itself, through a cavity formed in a mold that molds a reference block. In this case, the molten resin flowing in the longitudinal direction of the circumferential end face of the reference block does not easily separate from the inner wall of the mold in the presence of the curved surface which smoothly connects this circumferential end face and the side end face to each other. Even if resin separation or disorder of flow occurs at the outlet of the gate, its influence is limited within the cavity that forms the reference block, and does not act on the cavity that molds the prism itself.

The second aspect of the present invention resides in a mold characterized by having a cavity conforming to an outline of the resin-molded prism according to the first aspect, the mold comprising not less than two optical surfaces that are not parallel to each other, a pair of side end faces substantially perpendicular to the optical surfaces, at least one reference block projecting from either one of the pair of side end faces and having a circumferential end face extending in a projecting direction of the reference block, a positioning portion formed on the circumferential end face of the reference block, and a cavity surrounded by a molding surface that molds a curved surface for smoothly connecting the circumferential end face of the reference block and corresponding one of the pair of side end faces, wherein the circumferential end face and the corresponding one of the side end faces form an angle of not less than 90°.

Other objects and advantages beside those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of

DETAILED DESCRIPTION OF THE PREFERRED EMBODIMENTS

Figure 1:
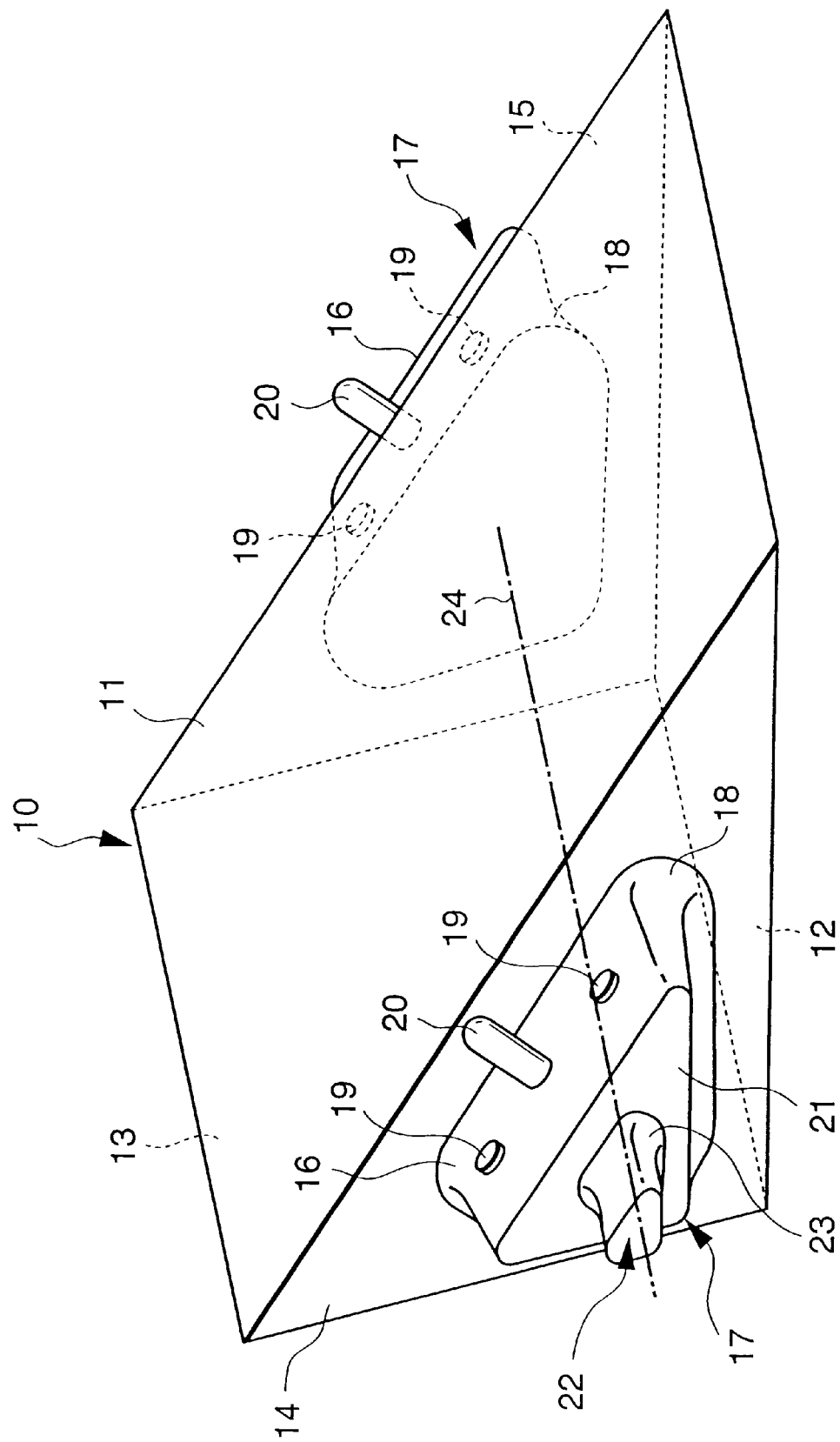
FIG. 1 is a perspective view showing the outer appearance of an embodiment in which a resin-molded prism according to the present invention is applied to a triangular prism.

In a resin-molded prism according to the first embodiment of the present invention, a positioning portion can have a flat portion parallel to one optical surface serving as a reference, and a pair of positioning pins projecting perpendicular to the flat portion. In this case, the circumferential end faces of a pair of reference blocks can each include the flat portion of the positioning portion, or the flat portion of the positioning portion can be made up of at least three projections projecting from the circumferential end face of each of the pair of reference blocks. If the positioning portion projects from the circumferential end face of each of the pair of reference blocks in this manner, when a resin flows in cavities that form the reference blocks, no projection that interferes with this flow is present in the cavities, so the resin flows smoothly, thereby suppressing formation of a flow mark.

Preferably, a curved surface has a radius of curvature of 0.5 mm or more.

Further preferably, the central axes of the pair of reference blocks in their projecting directions are arranged to form one straight line with a line that connects the barycentric positions of a pair of side end faces. When the line connecting the barycentric positions of the pair of side end faces and the central axes of the pair of reference blocks in their projecting directions are arranged to form one straight line in this manner, in a dwell process, the pressure uniformly acts up to the corners of the optical surfaces of the resin-molded prism, thus promoting formation of high-precision optical surfaces. In addition, the resin fills the cavity from the thickest portion where the resin is not cooled easily, and in the dwell process, the resin is replenished from the softest portion. Consequently, generation of a shearing stress and residual stress can be suppressed.

A gate can be further provided which projects from one of the pair of reference blocks in the projecting directions of the pair of reference blocks and has a circumferential end face extending in this projecting direction. In this case, preferably, one reference block has a vertex surface almost parallel to the side end faces, and the gate projects from this vertex surface. In this case, it is effective to further provide a curved surface for smoothly connecting the circumferential end face of the gate and the vertex surface of one reference block to each other, and to set the angle formed by the circumferential end face of the gate and the vertex surface to 90° or more.

Preferably, the curved surface which connects the circumferential end face of the gate and the vertex surface of one reference block has a radius of curvature of 0.5 mm or more.

Furthermore, preferably, the central axis of the gate in the projecting direction thereof is arranged to form one straight line with a line that connects the barycentric positions of the pair of side end faces.

It is naturally preferable that a mold according to the second aspect of the present invention have a cavity that defines the resin-molded prism described above.

Embodiments

Embodiments in which the resin-molded prism according to the present invention is applied to a triangular prism will be described in detail with reference to FIGS. 1 to 3. The present invention is not limited to these embodiments, but can be used as a combination of these embodiments, or can be applied to another technique that should be incorporated in the concept of the present invention described in the appended claims.

Figure 2:
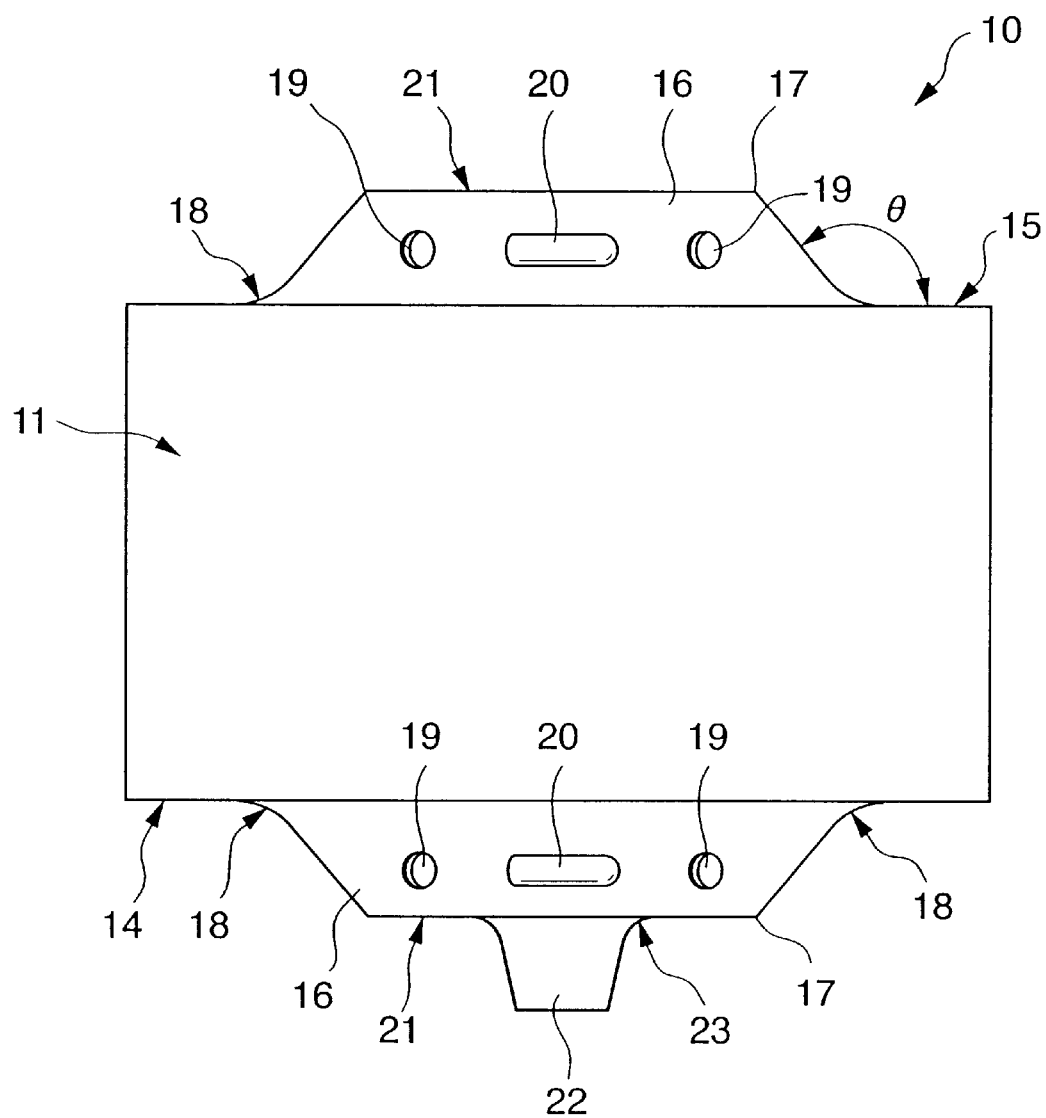
FIG. 2 is a plan view of the triangular prism shown in FIG. 1.

FIG. 1 shows the outer appearance of the first embodiment of the present invention, and FIG. 2 shows the planar shape of the same. More specifically, a triangular prism 10 according to this embodiment has three optical surfaces 11, 12, and 13 that are not parallel to each other, and a pair of side end faces 14 and 15 opposing each other to be perpendicular to the optical surfaces 11, 12, and 13 so as to sandwich them. A pair of reference blocks 17 respectively projecting from the pair of side end faces 14 and 15 and having circumferential end faces 16 extending in the projecting directions of the reference blocks 17 are almost similar to the triangular prism 10, and angles θ formed by the circumferential end faces 16 and the side end faces 14 and 15 are set to obtuse angles of 90° or more. The side end faces 14 and 15 and the circumferential end faces 16 of the reference blocks 17 are smoothly connected through curved surfaces 18 with a radius of curvature of 0.5 mm or more. The curved surfaces 18 surround the corresponding circumferential end faces 16.

A pair of flat portions 19 project from that portion of the circumferential end face 16 of each of the pair of reference blocks 17 which is set in the same direction as that of the optical surface 11 serving as the reference, to be parallel to the optical surface 11. A positioning pin 20 which forms the positioning portion of the present invention together with the pair of flat portions 19 projects from the circumferential end face 16 of the reference block 17 such that it is located between the pair of flat portions 19. The flat portions 19 and positioning pins 20 are formed with consideration so that when the triangular prism 10 is to be built in an optical device, it can be positioned with respect to the optical device quickly and correctly by urging the flat portions 19 against and fitting the positioning pins 20 in attaching portions which are formed on the optical device in advance.

The pair of reference blocks 17 respectively have vertex surfaces 21 almost parallel to the side end faces 14 and 15, and a gate 22 is connected to one of the vertex surfaces 21. The proximal end of the gate 22 and the corresponding vertex surface 21 are smoothly connected to each other through a curved surface 23 with a radius of curvature of 0.5 mm or more, and the curved surface 23 surrounds the gate 22. Even if the gate 22 is removed finally, no problem occurs.

In this embodiment, the central axis of the gate 22 in the longitudinal direction and the central axes of the pair of reference blocks 17 in their projecting directions are set such that they form one straight line with an axis 24 extending through the barycentric positions of the pair of side end faces 14 and 15 of the triangular prism 10, i.e., with that portion of the triangular prism 10 where the resin is cooled the most slowly during molding.

Therefore, the molten resin supplied during molding fills, through the gate 22 and reference block 17, the cavity formed in the mold in order to form the triangular prism 10 itself. The sectional area of the resin flow path at the gate 22 increases in the cavity which is formed in the mold in order to form the reference block 17, and is then enlarged stepwise in the cavity that forms the triangular prism 10, while making separation of the molten resin or disorder of the flow unlikely to occur in the presence of the curved surfaces 18 and 23. Even if such separation or disorder of flow should occur, its influence can be limited within the cavity that forms the reference block 17, so the optical characteristics of the triangular prism 10 itself can be maintained well. Regarding the residual stress of the resin during filling which tends to occur at the outlet of the gate 22, its influence range can be limited within the cavity that forms the reference block 17, thereby suppressing birefringence of the triangular prism 10 itself.

In the above embodiment, the reference blocks 17 and gate 22 are connected to those regions of the side end faces 14 and 15 where the resin is cooled the most slowly during injection molding. Alternatively, the reference blocks 17 and gate 22 can naturally be arranged at other arbitrary positions of the side end faces 14 and 15.

Figure 3:
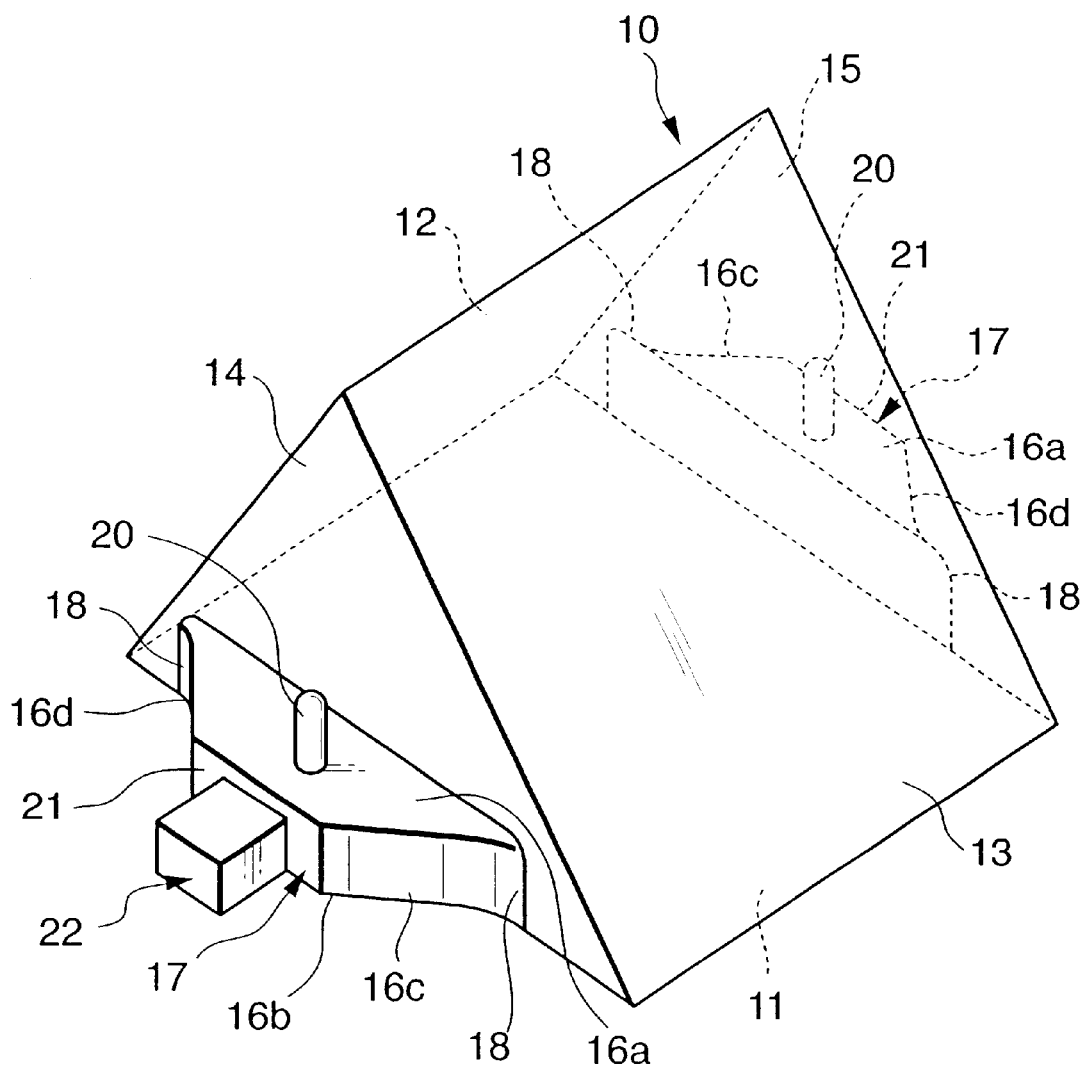
FIG. 3 is a perspective view showing the outer appearance of a triangular prism according to another embodiment of the present invention.

FIG. 3 shows the outer appearance of the second embodiment of the present invention based on this viewpoint. Elements with the same functions as those of the above embodiment are denoted by the same reference numerals, and a repetitive description thereof will be omitted. More specifically, of four circumferential end faces 16a, 16b, 16c, and 16d of each truncated pyramidal reference block 17, the circumferential end face 16a which is parallel to an optical surface 11 as a reference serves as a flat portion that forms the positioning portion of the present invention together with a positioning pin 20. Namely, the circumferential end face 16a is perpendicular to a side end face 14, and is smoothly connected to it through curved surfaces 18.

In this embodiment, the central axes of the reference blocks 17 in their projecting directions and the central axis of a gate 22 are displaced from a straight line 24 that connects the barycentric positions of the side end face 14 and a side end face 15 which form a pair. The circumferential end face 16b located on the opposite side to the circumferential end face 16a where the positioning pin 20 projects is set on the same plane as the optical surface 11 serving as the reference. Also, angles θ formed by the remaining circumferential end faces 16c and 16d and the side end face 14 are set to, e.g., about 150°. Thus, separation of the molten resin during filling can be prevented.

Figure 4:
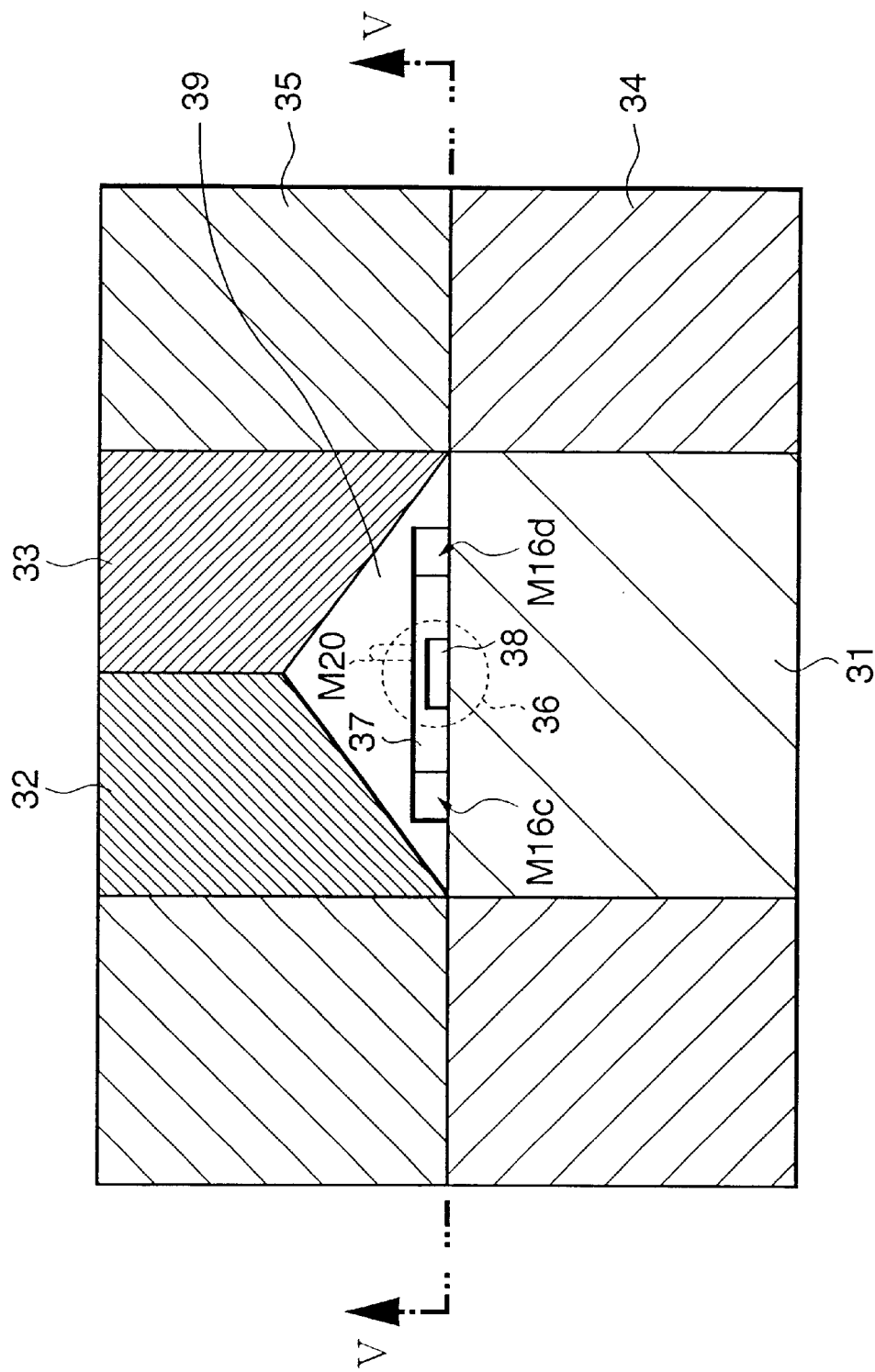
FIG. 4 is a sectional view showing the internal structure of an example of a mold according to the present invention which injection-molds the triangular prism of the embodiment shown in FIG. 3.
Figure 5:
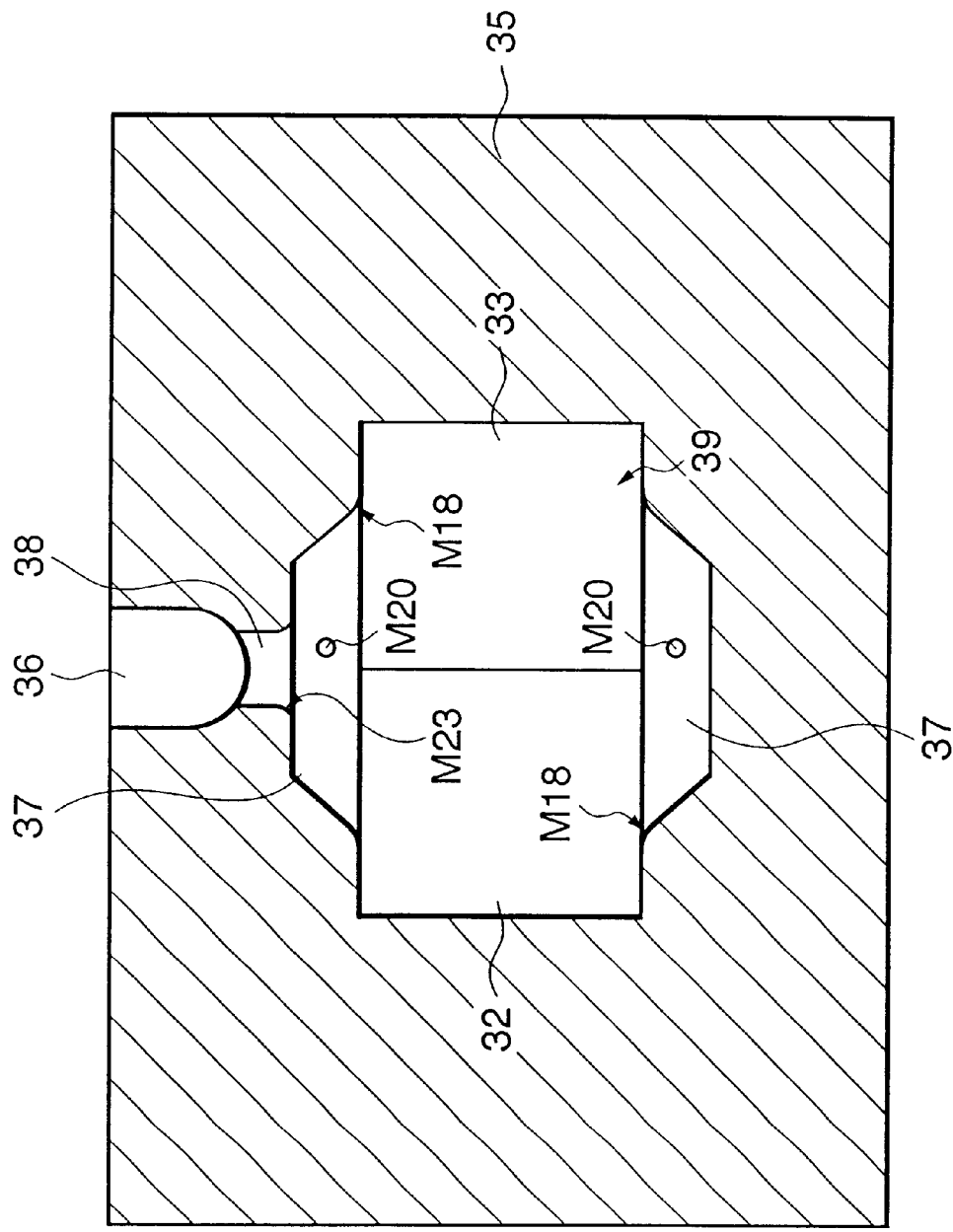
FIG. 5 is a sectional view taken along the line or arrows V—V of FIG. 4.
Figure 6:
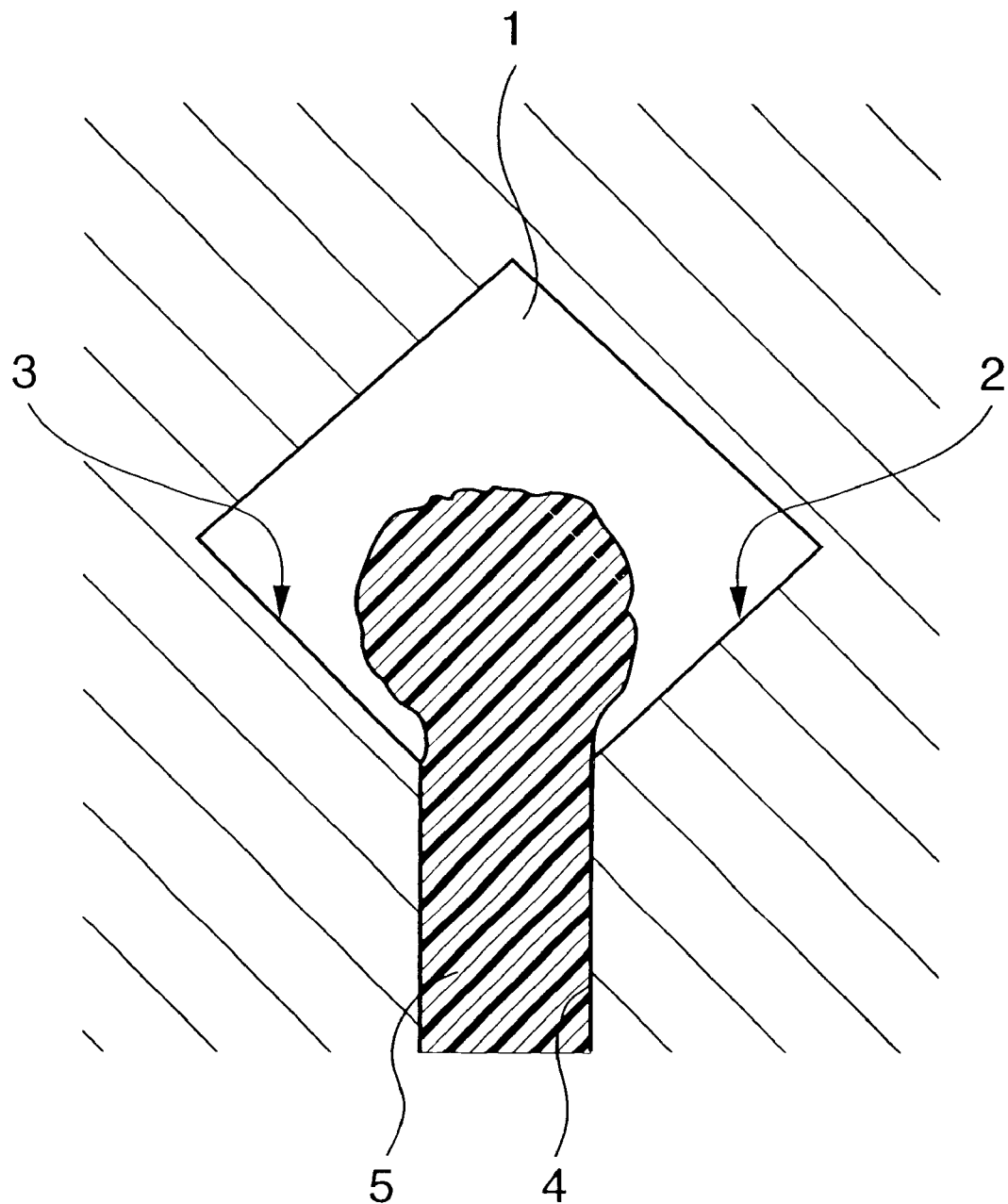
FIG. 6 is an illustration showing, together with FIGS. 7 and 8, a process of filling a cavity with a molten resin, and shows a state at the start of filling.
Figure 7:
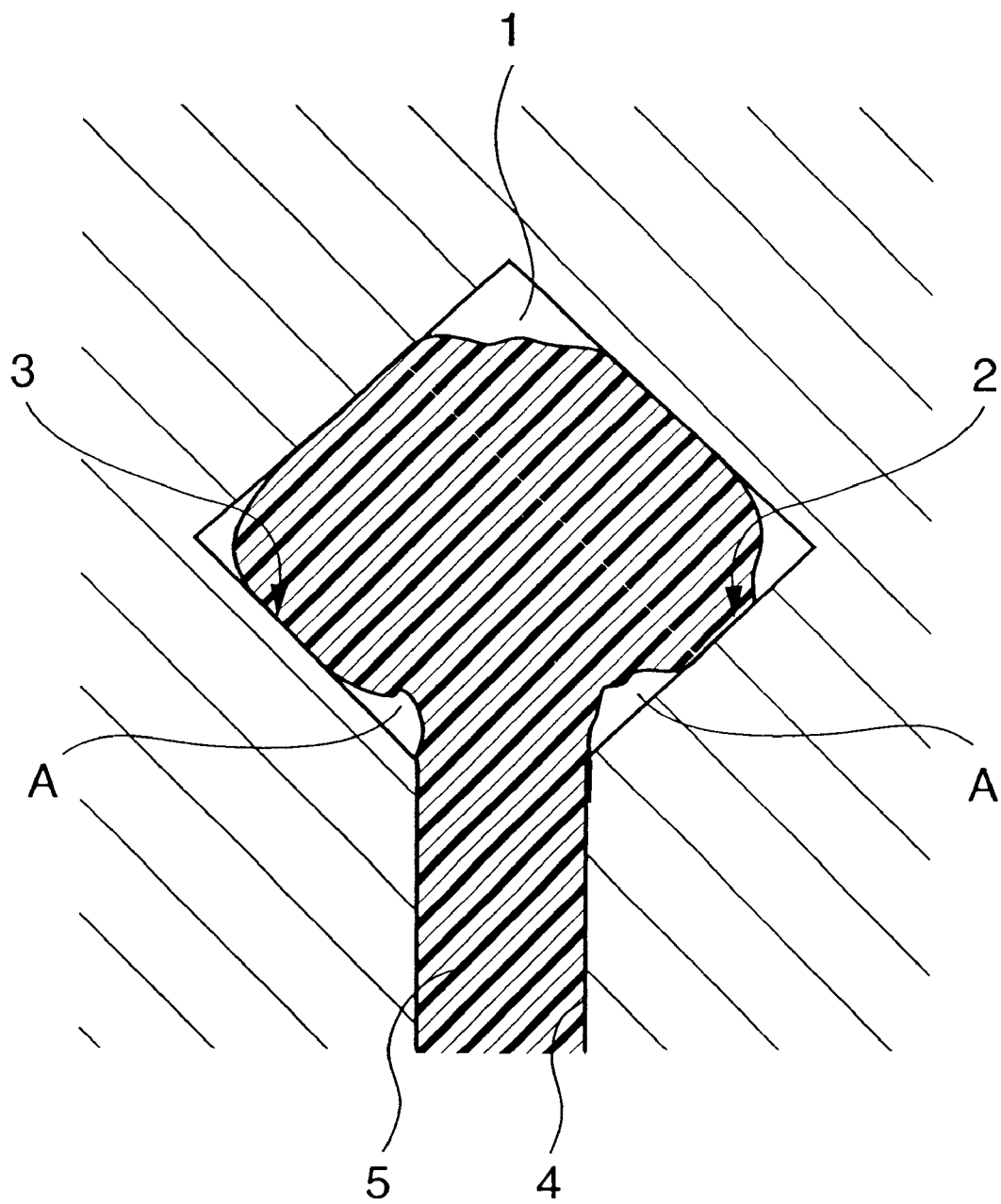
FIG. 7 is an illustration showing, together with FIGS. 6 and 8, the process of filling the cavity with the molten resin, and shows a state during filling.
Figure 8:
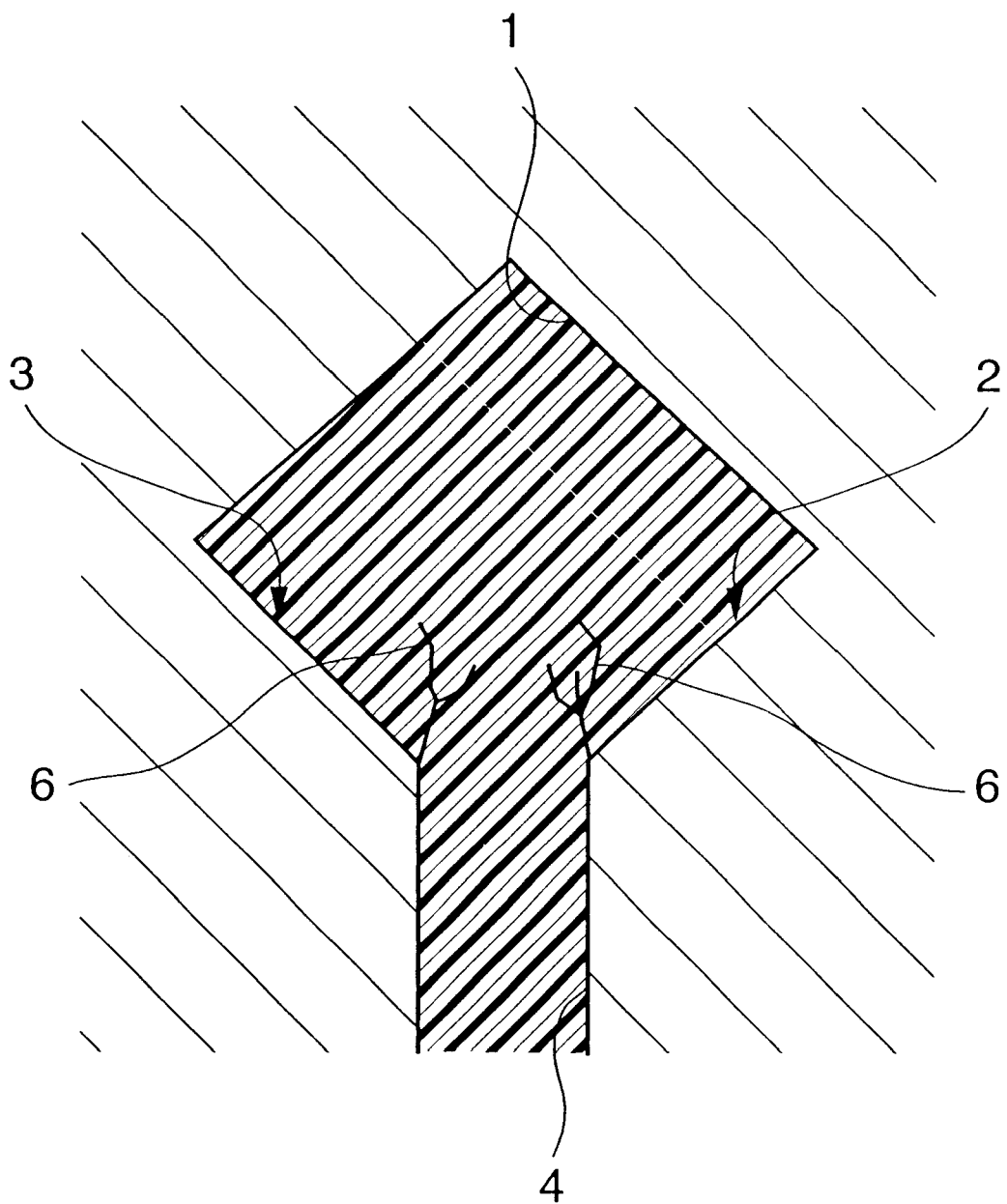
FIG. 8 is an illustration showing, together with FIGS. 6 and 7, the process of filling the cavity with the molten resin, and shows a state at the end of filling.

FIG. 4 shows an example of a mold for injection-molding a triangular prism 10 according to the second embodiment, and FIG. 5 shows the sectional structure of the same taken along the line of arrows V—V of FIG. 4. Those portions of the molding portions which correspond to the respective portions of the triangular prism 10 are denoted by the same reference numerals of the corresponding portions but with a prefix "M". More specifically, the mold according to this embodiment has three specular pieces 31, 32, and 33 for molding optical surfaces 11 to 13, a first holding piece 34 for holding the specular piece 31 which forms the optical surface 11 serving as the reference, and a second holding piece 35 surrounding the specular pieces 32 and 33, which form the two remaining optical surfaces 12 and 13, to form the side end faces 14 and 15 and reference blocks 17 of the triangular prism 10. A runner 36 is formed between the pair of holding pieces 34 and 35 to extend straightly in the extending directions of cavities 37 and 38 which respectively form the reference blocks 17 and gate 22.

Hence, the molten resin supplied from an injector (not shown) flows through the runner 36 and is finally supplied into a cavity 39 with a shape corresponding to the triangular prism 10 described above. As described in the first embodiment, the sectional area of the resin flow path in the cavity 38 that forms the gate 22 increases in the cavity 37 which is formed in the second holding piece 35 in order to form the reference block 17, and is then enlarged stepwise in the cavity 39 that forms the triangular prism 10, while making separation of the molten resin or disorder of the flow unlikely to occur because of the presence of molding surfaces M18 and M23 corresponding to the curved surfaces 18 and 23. Even if such separation or disorder of the flow of the resin should occur, its influence can be limited within the cavity 37 that forms the reference block 17, so the optical characteristics of the triangular prism 10 itself can be maintained well. Regarding the residual stress of the resin during filling which tends to occur at the outlet of the gate 22, its influence range can be limited within the cavity 37 that forms the reference block 17, thereby suppressing birefringence of the triangular prism 10 itself.

With the resin-molded prism according to the above embodiment, curved surfaces that smoothly connect the circumferential end faces of a pair of reference blocks and a pair of side end faces are formed, and angles formed by the circumferential end faces of the reference blocks and the side end faces are set to 90° or more. Even if separation or disorder of the flow of the resin should occur at the outlet of the gate, its influence can be limited within the cavity that forms the reference block, so the optical characteristics of the prism itself with the optical surfaces can be maintained well. Regarding the residual stress of the resin during filling which tends to occur at the outlet of the gate, its influence range can be limited within the cavity that forms the reference block. Hence, birefringence of the prism itself with the optical surfaces can be suppressed.

In this manner, when injection-molding a resin-molded prism, adverse influences such as separation or disorder of the resin in the vicinity of the outlet of the gate do not easily adversely affect the prism itself with the optical surfaces. Consequently, the molding conditions such as a resin filling rate and resin temperature can be moderated than those of a conventional case, and the moldability is improved, so that a prism with a good optical performance and capable of highly precise positioning can be manufactured stably on the mass production basis.

If the positioning portion has a pair of positioning pins projecting perpendicular to a flat portion parallel to one optical surface serving as the reference, or if the flat portions of the positioning portions are made up of at least three projections projecting from the circumferential end faces of the pair of reference blocks, since no projection that interferes with the flow of the resin is present in the cavities that form the reference blocks, formation of a flow mark on the prism itself with optical surfaces can be prevented. Note that the positioning portions can be utilized as positioning references when building a resin-molded prism in an optical device.

If each curved surface has a radius of curvature of 5 mm or more, separation or disorder of the flow of the resin can be further decreased.

If the central axes of the pair of reference blocks in their projecting directions are arranged to form one straight line with a line connecting the barycentric positions of the pair of side end faces, in the dwell process, the pressure uniformly acts up to the corners of the optical surfaces of the resin-molded prism, thus promoting formation of the high-precision optical surfaces. In addition, the resin fills the cavity from the thickest portion where the resin is not cooled easily, and in the dwell process, the resin is replenished from the softest portion. Consequently, generation of a shearing stress and residual stress can be suppressed.

If curved surfaces that smoothly connect the circumferential end face of the gate and the vertex surface of one reference block are formed, and angles formed by the circumferential end face of the gate and the vertex surface are set to 90° or more, separation or disorder of the flow of the resin that tends to occur at the outlet of the gate can be further moderated, and its influence can be limited more reliably within the cavity that forms the reference block.

With the mold according to the above embodiment, a resin-molded prism as described above can be formed by injection molding.

The present invention is not limited to the above embodiments and various changes and modifications can be made within the spirit and scope of the present invention. Therefore, to apprise the public of the scope of the present invention the following claims are made.

What is claimed is:

1. A resin-molded prism comprising:

two optical surfaces that are not parallel to each other;

a pair of side end faces substantially perpendicular to said optical surfaces;

at least one reference block projecting from either one of said pair of side end faces and having a circumferential end face extending in a projecting direction of said reference block;

a positioning portion formed on the circumferential end face of said reference block;

a curved surface for smoothly connecting the circumferential end face of said reference block and corresponding one of said pair of side end faces; and a gate that projects from said reference block in the projecting direction thereof and has a circumferential end face extending in the projecting direction, wherein the circumferential end face of said reference block and the corresponding one of said side end faces form an angle of not less than 90° and a central axis of said gate in the projecting direction thereof is arranged to form one straight line with a line that connects barycentric positions of said pair of side end faces.

2. A triangular prism formed from a resin material for attaching to an attaching portion of an optical device, comprising:

three optical surfaces that are not parallel to each other;

a pair of side end faces opposing each other and perpendicular to the optical surfaces;

a pair of reference blocks respectively projecting from said pair of side end faces;

a pair of flat portions projecting from one surface of each of said reference blocks; and a positioning pin projecting from said one surface of each of said reference block, so that said triangular prism is positioned on said optical device by fitting the position pin in the attaching portion and placing said pair of flat portions against the attaching portion.

3. A triangular prism formed form a resin material for attaching to an attaching portion of an optical device, comprising:

three optical surfaces that are not parallel to each other;

a pair of side end faces opposing each other and being perpendicular to the optical surfaces;

a pair of reference blocks respectively projecting from said pair of side end faces;

a gate connected to a vertex surface of one of said reference blocks, which said vertex surface is substantially parallel to one of the side end faces;

a curved surface formed between side surfaces of said reference blocks and said side end faces;

a pair of flat portions for positioning the triangular prism on the attaching portion, said pair of flat portions projecting from one surface of each of said reference block, which said one surface is parallel to one of the three optical surface; and a positioning pin projecting from said one surface of each of said reference blocks to be fitted in the attaching portion.

* * * * *

UNITED STATES PATENT AND TRADEMARK OFFICE
CERTIFICATE OF CORRECTION

PATENT NO. : 6,707,622 B2
DATED : March 16, 2004
INVENTOR(S) : Takahiro Tominaga It is certified that error appears in the above-identified patent and that said Letters Patent is hereby corrected as shown below:

Column 8,
Lines 24 and 44, "block," should read -- blocks, --;
Line 25, "position" should read -- positioning --;
Line 28. "form" should read -- from --; and
Line 45, "surface," should read -- surfaces, --.

Signed and Sealed this

Twentieth Day of July, 2004

JON W. DUDAS
*Acting Director of the United States Patent and Trademark Office*